3,044,870
PRODUCTION OF SODIUM
Stuart G. McGriff, Pittsburgh, Pa., assignor to Callery Chemical Company, Pittsburgh, Pa., a corporation of Pennsylvania
Filed Oct. 16, 1958, Ser. No. 767,544
8 Claims. (Cl. 75—66)

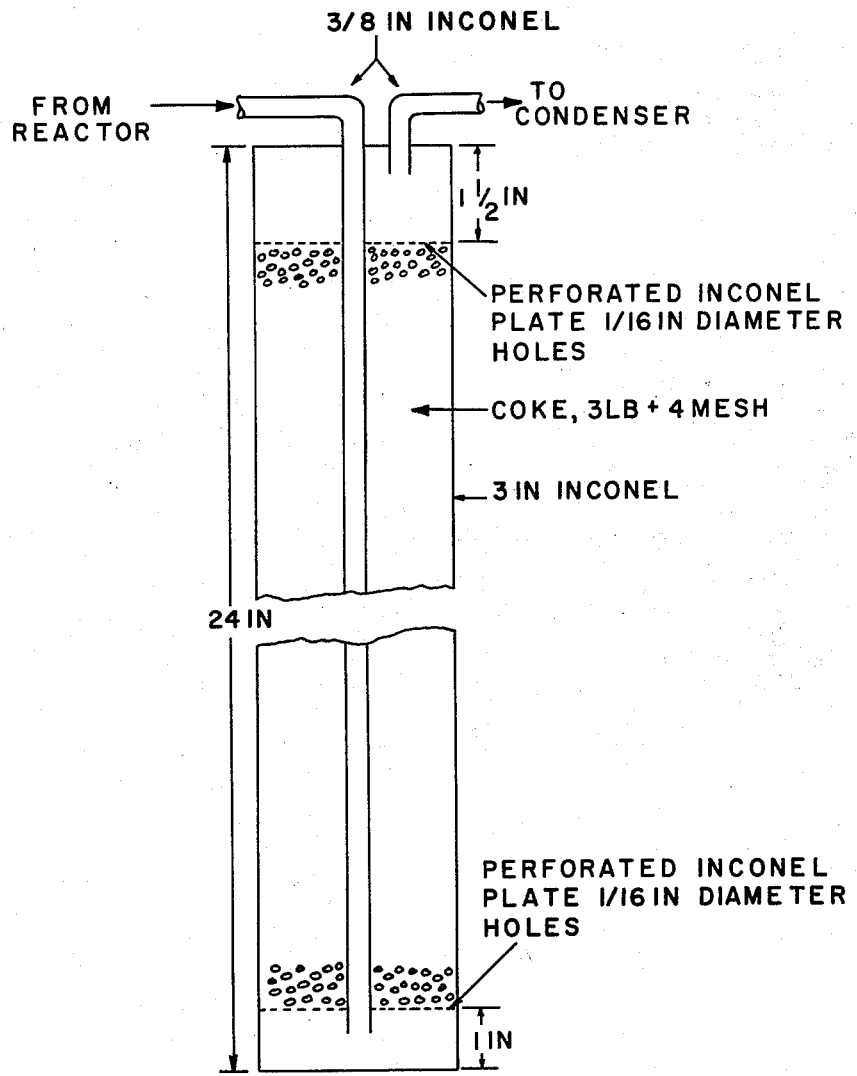

This invention relates to an improvement in the carbothermic process for the production of sodium.

Although substantially all sodium produced commercially today is obtained from processes in which electricity is used to provide the necessary energy, it has long been recognized in the sodium field that a process which would avoid the use of electrical power offers certain valuable advantages over the electrolytic methods. Consequently, considerable research effort has been expended in attempts to develop an economical non-electrolytic process. It has been generally agreed that the most feasible and theoretically sound approach lies in the reduction of sodium carbonate with carbon at elevated temperatures. However, low yields and mechanical difficulties have thus far prevented the successful commercial use of such a carbothermic process.

Carbothermic production of sodium comprises the reduction of sodium carbonate by contact with carbon at high temperatures to produce sodium vapor and oxides of carbon, and the subsequent condensation of the sodium vapor to recover pure sodium. The chief difficulties in obtention of economical yields of sodium are in the removal of entrained and vaporized sodium carbonate and oxide and in condensing the sodium vapor while preventing a reaction in the reverse direction between the sodium and the carbon oxides present, both of which result in plugging and encrustation of the condensing apparatus and contamination of the product.

It is an object of this invention to provide an improved process for the carbothermic production of sodium.

Another object is to provide a means of inhibiting reverse reaction in the condensing step of a carbothermic sodium process.

Still another object is to remove entrained and vaporized sodium carbonate and oxide from the effluent stream from a carbothermic sodium reactor, prior to condensation.

Other objects will become apparent from time to time hereinafter.

Heretofore, it has been generally believed that little, if any, carbon dioxide is formed during the reduction of sodium carbonate, and that the reverse reaction which makes the condensing operation difficult occurs primarily between the sodium vapor and carbon monoxide. Emphasis, therefore, has been placed on condenser design which permits rapid quenching. While rapid-quench condensation and other techniques of similar effect have considerably improved the carbothermic process, such methods require special condensers and auxiliary equipment, are difficult to carry out, and have not completely eliminated the problem.

I have found, and this invention is based largely upon this discovery, that the back-reaction of sodium with carbon monoxide is relatively unimportant in the condensing step, and that the difficulties normally encountered are due primarily to the reaction of sodium with carbon dioxide. Furthermore, it appears that substantial amounts of carbon dioxide are present in the effluent gas stream from the reactor. Thus, when carbon dioxide is removed prior to cooling of the gas stream, the undesirable back-reaction of sodium and carbon dioxide depends upon the formation of carbon dioxide in the condenser and the reaction $CO \rightarrow CO_2 + C$ is the rate-controlling step. Since this reaction proceeds at a relatively slow rate, condensation and recovery of sodium may be accomplished with little difficulty.

This invention in its broad aspects comprises the step of contacting the effluent gas stream from a carbothermic sodium reactor with heated carbonaceous material prior to condensation. The term "carbonaceous material" as used herein includes any substance, such as coke, which contains a substantial amount of free carbon. The use of this step in a carbothermic process results in (1) removal of entrained sodium carbonate and sodium oxide by mechanical contact; (2) the removal of vaporized sodium carbonate and oxide by reduction to produce additional sodium, and (3) the conversion of the carbon dioxide produced in the carbothermic reactor to carbon monoxide.

Each of the above effects contributes to the improvement of the overall process. Removal of entrained and vaporized sodium carbonate and oxide prevents deposition of these compounds in the condenser and resultant plugging and contamination. Conversion of the carbon dioxide present in the effluent stream to carbon monoxide is a particularly important effect which makes possible the condensing of sodium without appreciable back-reaction.

The coke or other carbonaceous material is ordinarily placed in a separate vessel or scrubber through which the effluent stream from the reactor is passed. However, other methods may also be used. For example, the carbonaceous material need not be contained in a separate vessel but can be included within the carbothermic reactor, either as a discrete bed or in finely divided form. The carbonaceous material must not be completely submerged within the melt, however, but must be placed so as to be exposed at least in part to the gaseous products of the reaction. Similarly, the configuration of the separate vessel or scrubber, if one is used, is not critical provided it is designed as an effective de-entrainer and heat exchanger and so as to expose adequate surface of the carbonaceous material to the product stream.

It is preferred to maintain the carbonaceous material used to contact the effluent stream at a temperature the same as or somewhat above that of the melt, which is above 950° C. in most instances. However, the temperature used may be below that of the melt provided that a temperature of at least about 900° C. is maintained. The only upper limit to the temperatures which may be used is that imposed by mechanical and economic considerations in view of the strength and life of the materials of construction employed. Thus very high temperatures, i.e., several thousand degrees, can be used if desired, although temperatures below about 1500° C. are preferred.

The drawing which is part of this specification shows a scrubber which has been used to demonstrate the method of this invention. As shown, it consisted of a closed 3 inch Inconel pipe with an inlet from the carbothermic reactor extending to a point near the bottom and an outlet at the top connected to the condenser. The pipe was filled with 4 mesh coke. This apparatus was used in conjunction with a 20 inch by 12 inch reactor and a 42 inch by 6 inch oil spray condenser, along with suitable auxiliary equipment. The data for several runs carried out with this system are tabulated below. In these runs the feed to the reactor consisted of sodium carbonate and coke in a 4.17 to 1 weight ratio, and the scrubber was maintained at the temperature of the melt.

| Run | Reactor Pressure, p.s.i.g. | Melt Temp., °C. | Reaction Time, hours | Estimated Sodium Production Rate, lb./hr. |
|---|---|---|---|---|
| 1 | 2.0–5.0 | 1,085–1,115 | 13.75 | 1.28 |
| 2 | 4.0–14.5 | 1,090–1,145 | 9.0 | 1.5 |
| 3 | 0.25–8.5 | 1,040–1,120 | 64.0 | 1.1 |
| 4 | 9.0–15.0 | 1,105–1,150 | 20.5 | 2.0 |

During these runs comparatively little trouble was experienced with the condensing system. Examination of the scrubber after use showed that some of the coke had been consumed.

According to the provisions of the patent statutes, I have explained the principle and mode of practicing my invention, have described what I now consider to be its best embodiments. However, I desire to have it understood that within the scope of the appended claims, the invention may be practiced otherwise than as specifically described.

I claim:

1. In a process for producing sodium by contacting molten sodium carbonate with a carbonaceous reductant and condensing the resultant sodium from the product gases, the improvement which comprises intimately contacting said product gases with a carbonaceous material at a temperature of at least about 900° C. and reacting carbon dioxide contained in said product gases with said carbonaceous material to produce carbon monoxide therefrom, prior to condensation of the sodium.

2. The improvement in accordance with claim 1 in which said carbonaceous material is coke.

3. The improvement in accordance with claim 1 in which the carbonaceous material is contained in a vessel separate from that in which the sodium is produced.

4. The improvement in accordance with claim 1 in which the carbonaceous material is at a temperature at least the same as the temperature of the molten sodium carbonate.

5. A method of producing sodium which comprises contacting sodium carbonate with a carbonaceous reductant in a reaction zone at a temperature of at least about 950° C., intimately contacting the gaseous products from the reaction zone with a carbonaceous material at a temperature of at least about 900° C. and reacting carbon dioxide contained in said gaseous products with said carbonaceous material to produce carbon monoxide therefrom and condensing and recovering the sodium thus produced.

6. A method according to claim 5 in which said carbonaceous material is coke.

7. A method according to claim 5 in which the temperature of the carbonaceous material is at least the temperature of the molten sodium carbonate.

8. A method according to claim 5 in which the carbonaceous material is contained in a vessel separate from the reaction zone.

References Cited in the file of this patent

UNITED STATES PATENTS

| | | |
|---|---|---|
| 1,366,655 | Haslup | Jan. 25, 1921 |
| 1,823,175 | Stafford | Sept. 15, 1931 |
| 2,096,779 | Bartholomew et al. | Oct. 26, 1937 |
| 2,293,113 | Carney | Aug. 18, 1942 |
| 2,308,418 | Hanawalt et al. | Jan. 12, 1943 |
| 2,810,636 | Kirk | Oct. 22, 1957 |